Nov. 11, 1941.   J. R. GOMERSALL ET AL   2,262,279
MEANS FOR CONTROLLING TIMED SIGNALS
Filed Aug. 10, 1940   3 Sheets-Sheet 3
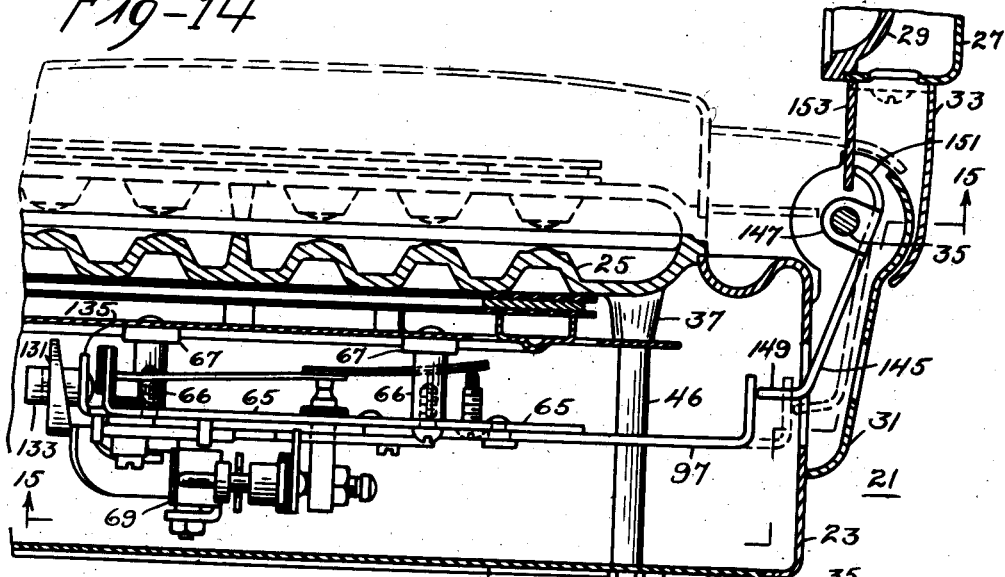
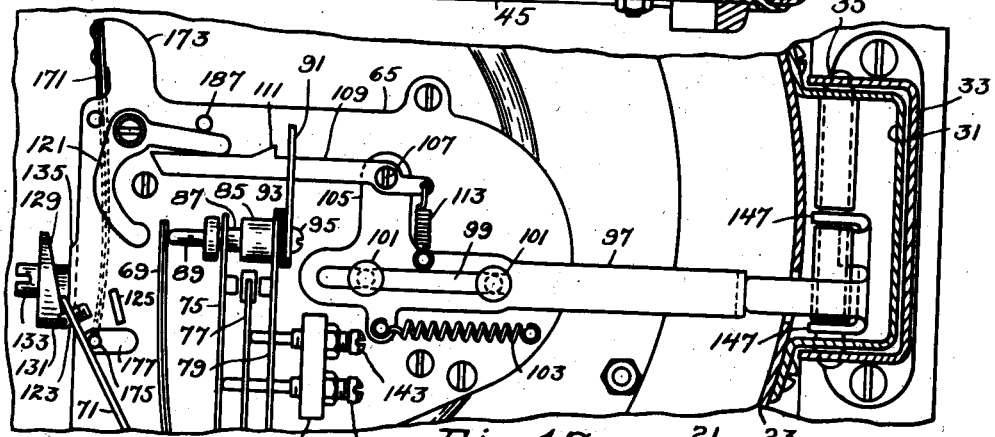
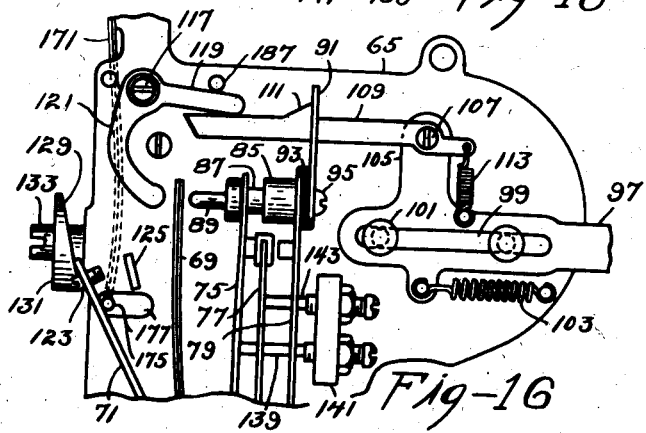
INVENTORS
JOHN R. GOMERSALL
BY MURRAY IRELAND
ATTORNEY Patented Nov. 11, 1941

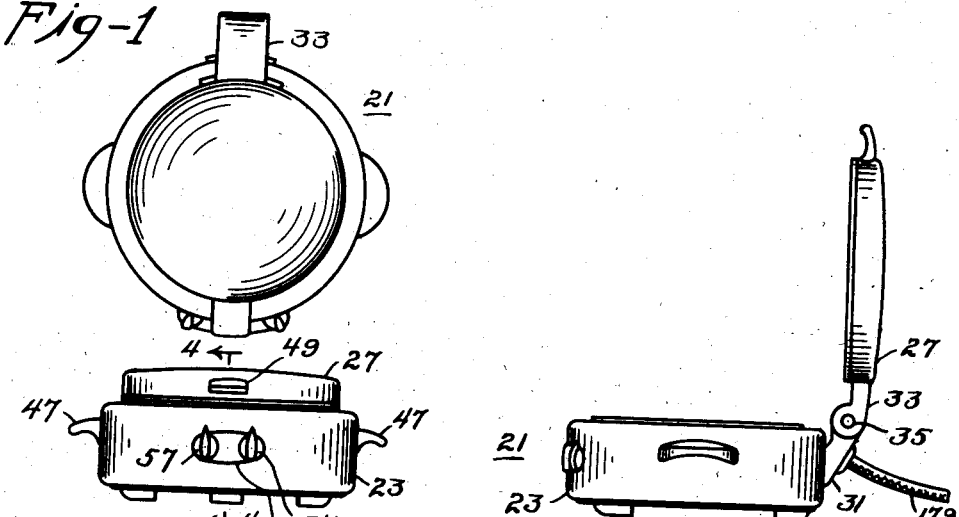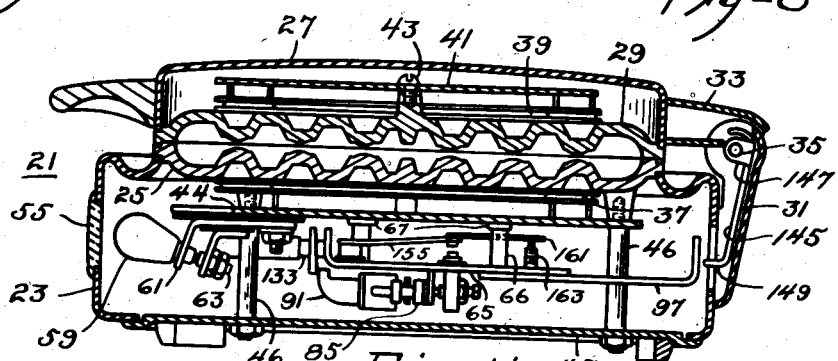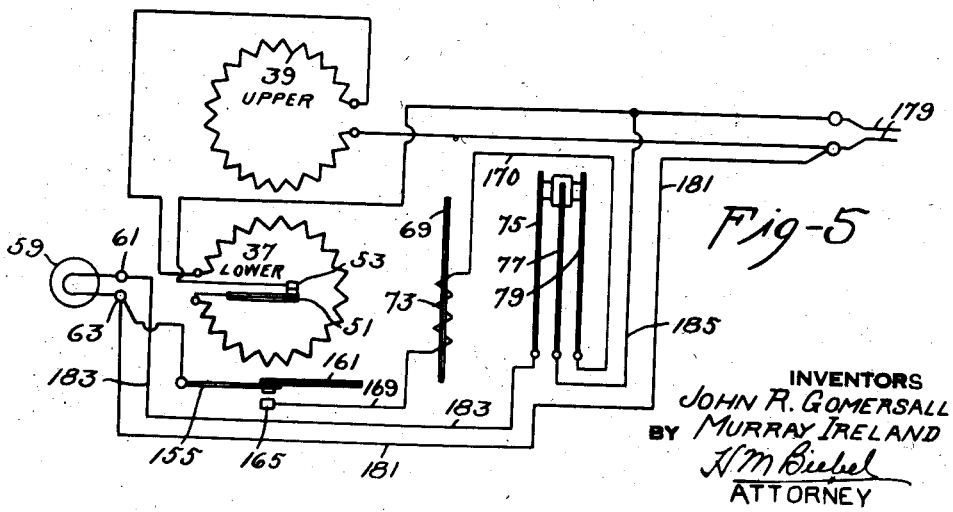

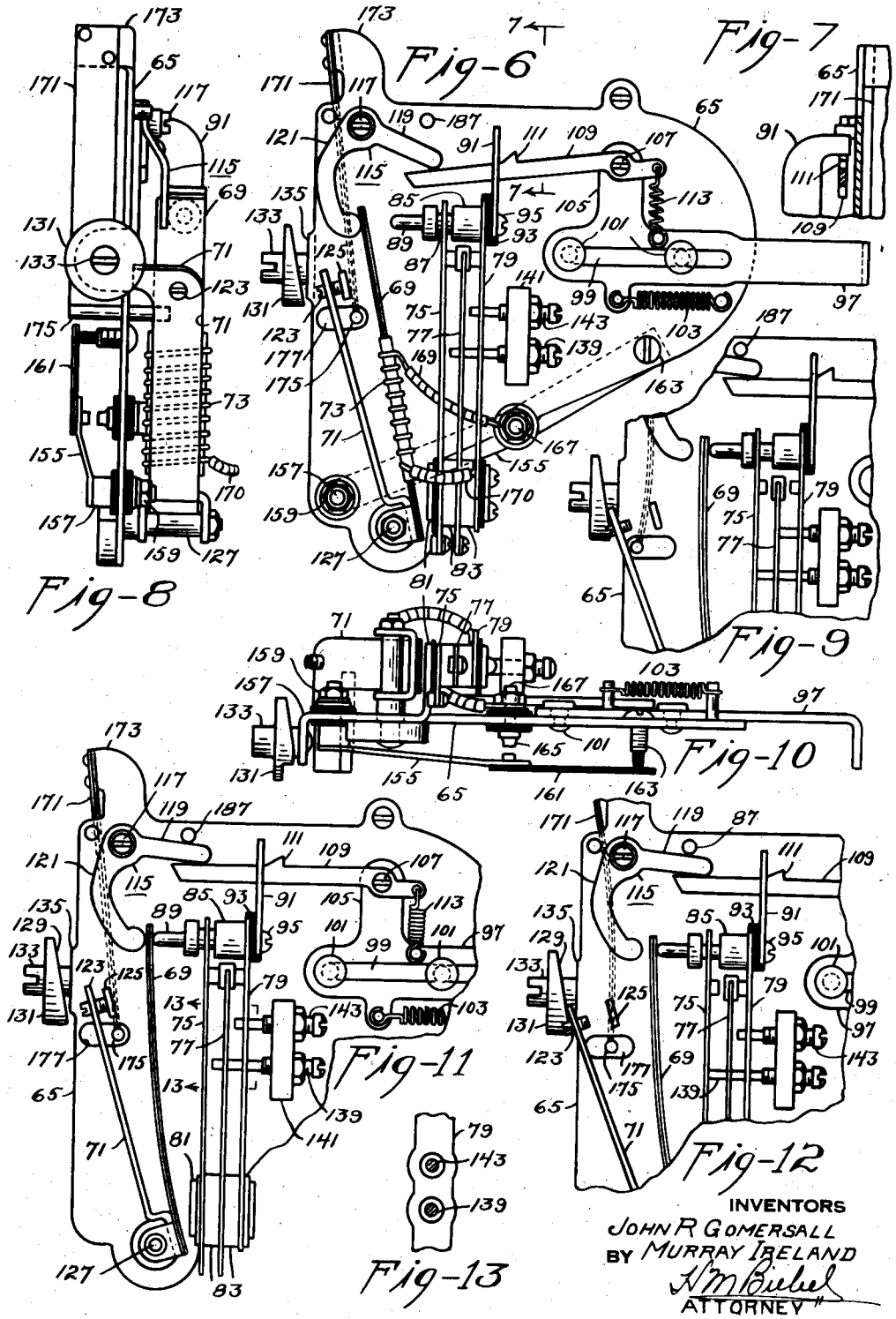

2,262,279

UNITED STATES PATENT OFFICE 2,262,279

MEANS FOR CONTROLLING TIMED SIGNALS

John R. Gomersall, Minneapolis, Minn., and Murray Ireland, near Elgin, Ill., assignors to McGraw Electric Company, Elgin, Ill., a corporation of Delaware Application August 10, 1940, Serial No. 352,058

11 Claims. (Cl. 161—16)

Our invention relates to electric cooking appliances and particularly to electric waffle bakers.

An object of our invention is to provide a novel form of thermal timer for indicating the proper times to initiate and to terminate a waffle baking operation.

Another object of our invention is to provide a thermal timer for controlling a signal, operable substantially independently of the temperature of the waffle grids.

Another object of our invention is to provide a thermal timer operable substantially independently of the temperature of the waffle grids that shall include means to ensure that the timer shall indicate properly under all ordinary operating conditions.

Another object of our invention is to provide a novel method of operating a thermally energized timing means for a signal, operable substantially independently of the temperature of the waffle grids.

Another object of our invention is to provide a thermal timer that shall be normally maintained in operating condition when associated with an intermittently operable cooking appliance which must be maintained in a heated condition while idling.

Still another object of our invention is to provide a thermal timing mechanism operating on a cool-off heat-up cycle during its timing operation.

Other objects of our invention will either be evident from a description of one form of device embodying our invention or will be pointed out hereinafter, particularly in the appended claims.

In the drawings,

Figure 1 is a top plan view of a waffle baker embodying our invention, shown on a reduced scale, Fig. 2 is a view in front elevation thereof, Fig. 3 is a view in side elevation thereof with the upper grid and casing in its raised position, Fig. 4 is a vertical sectional view taken on the line 4—4 of Fig. 2, but on an enlarged scale Fig. 5 is a diagram of connections of the electric circuits of the waffle baker embodying our invention, Fig. 6 is a plan view of the signal control mechanism disassociated from the waffle baker in which it is mounted and shown when cold and with no current flowing through the waffle baker, Fig. 7 is a fragmentary sectional view taken on the line 7—7 of Fig. 6, Fig. 8 is a front elevational view of the parts shown in Fig. 6, Fig. 9 is a fragmentary plan view showing certain of the parts of the timing device under certain operating conditions thereof, Fig. 10 is a side elevational view of the parts shown in Fig. 6, Fig. 11 is a view similar to Fig. 6 except that certain parts thereof are shown in different operating positions, Fig. 12 is a fragmentary view showing parts of the thermal timing means under other operating conditions, Fig. 13 is a fragmentary view taken on the line 13—13 of Fig. 11, Fig. 14 is a vertical sectional fragmentary view showing certain parts of the waffle baker and of the thermal timing means, Fig. 15 is a fragmentary plan view of the parts shown in Fig. 14 taken on the line 15—15 thereof, and, Fig. 16 is a fragmentary view similar to Fig. 15 and showing parts of the thermal timing means in still other operating positions.

Referring first of all to Figs. 1 to 4 inclusive, we have there illustrated a waffle baker designated by the numeral 21 which includes a lower casing 23 of substantially circular shape having mounted thereon a grid 25 which may be of the usual type used in waffle bakers. The waffle baker includes further an upper casing 27 having associated therewith an upper grid 29 and it may here be pointed out that the design of the upper and lower casings and of the upper and lower grids constitute no part of our invention and any suitable construction, size and shape of such cooperating parts may be employed by us.

The bottom casing has associated therewith a hinge cover member 31 while the upper casing has associated therewith a hinge cover member 33 and a hinge pin 35 connects the two pivotally so that the upper casing and grid may be turned to a substantially vertical position relatively to the lower casing in order to permit of an operator pouring batter on the lower grid.

The lower grid 25 has associated therewith any desired form of electric heating element 37 and the upper grid may have associated therewith an electric heating element 39. These heating elements may be secured in clamping or tightly fitting engagement with the outer surfaces of the respective grids in any suitable or desired manner. Since the design and mounting of the main heating elements constitutes no part of our invention, details thereof have not been shown. A clamping plate 41 may hold the upper heater 39 in clamping engagement with the grid 29 by means of a single central screw 43 and the lower heater 37 may be held by a clamping plate 44.

A bottom plate 45 may be provided as is usual in structures of this kind and may be held by studs 46 from the lower grid. Side lifting handles 47 may be provided on the lower casing 23 and the upper casing 27 may be provided with a lifting knob 49, all in a manner well known in the art.

As is well known, it is necessary to pre-heat the baking grids of a waffle iron before the appliance can be used to bake waffles. It is highly desirable to be assured in a relatively simple manner and by simple means that the waffle iron is ready for operation, that is, the temperature desired to be obtained in the grids has been reached. One of the important elements of our invention includes the use of grid-temperature controlled thermally-actuable means to regulate the operating temperature of the grids. We have shown, in Fig. 5, a bimetal bar 51 associated directly with and subject to the temperature of the lower grid, which has mounted on its outer end a contact adapted to cooperate with fixed contact 53 to interrupt the circuit through the heating elements 37 and 39 whenever the temperature reached by the grids exceeds a predetermined value.

While we have shown generally only one form of thermally controlled heating element controlling switch, we do not desire to be limited thereto since any similar thermally-actuable switch subject to grid temperature may be used by us to control the energization of the main grid heaters in a manner now well known in the art.

We may further also point out that we prefer to use heating elements associated with the grids which have a relatively large heating capacity greater than is ordinarily used in devices of this kind at the present time in order that the duration of the preheating period may be shortened as well as that the duration of a waffle baking operation may be relatively short. This, of course, may not be of great importance in domestic waffle bakers used in the home but it is of importance in waffle bakers used in restaurants and other similar places where a relatively large number of calls for waffles may be received within a short time during the rush period of the day.

The lower casing 23 has mounted thereon a translucent window 55 fitting into an opening in the lower casing and an adjusting knob 57 is mounted thereon adjacent one end thereof whereby the thermally-actuable temperature controlling member 51 or an associated part may be adjusted to obtain different operating temperatures varying say from 330° to 470°. These temperature values are given only for illustrative purposes and are not to be taken in a limiting sense although it may be here pointed out that a temperature of 400° is considered a good operating grid temperature in ordinary waffle baking.

As a means for indicating to the user of a waffle baker embodying our invention, the operating conditions thereof as regards the proper time for initiating and for terminating a waffle baking operation, we provide a small incandescent lamp 59 which may be suitably mounted within the casing 23 and which may be provided with electric terminals 61 and 63 (see Fig. 5) to connect the same in circuit in the manner shown in Fig. 5 and to be hereinafter described in detail. We have elected to show a small incandescent lamp of normal supply circuit voltage although we do not desire to be limited thereto and may use an audible signal or some kind of a visible signal.

To control the signal 59, we provide a thermal timing mechanism shown substantially in its entirety in Fig. 6 of the drawings, this figure showing a view as would be obtained if the waffle baker embodying such structure were turned upside down and the observer would look at it in such inverted position.

A supporting plate 65 may be supported from the lower grid 25 as by depending lugs 66 as shown particularly in Figs. 4 and 14 or in any other suitable manner it being, however, understood that this plate 65 is out of close heat-interfering or heat-receiving relationship with the lower grid and its associated electric heater. The plate 65 may be supported from the lower heater-clamping plate 44 as by studs 66 with heat insulating washers 67 therebetween. A main bimetal bar 69 has one end thereof secured to an adjacent end of a relatively rigid bar 71 which is provided at one end with an off-set portion as shown, for instance, in Fig. 6 of the drawings, so that the major portion of bar 71 will be spaced from the bimetal bar 69 under substantially all ordinary conditions of operation. An auxiliary electric heater 73 is insulatedly mounted upon the warp-acting bimetal bar 69 in order that the temperature of the bimetal bar 69 may be varied to cause warping movement of a part of the bimetal bar in a manner to be hereinafter described in detail.

A triple arm switch comprises an outer resilient contact bar 75, an intermediate contact bar 77, and a second outer contact bar 79, all of which are insulatedly supported from the plate 65 as by a bracket 81 secured thereto, the contact bars being insulated from each other by suitable blocks 83 of electric insulating material, all in a manner well known in the art. It may be here pointed out that contact bar 75 is biased normally and initially toward the intermediate bar 77 and that the other outer contact bar 79 is biased in the other direction, that is, against the bars 75 and 77 and that normally the bias of bar 79 is sufficient to balance or even slightly overcome the bias of bars 75 and 77 in the other direction. A stud 85 of electric-insulating material is fixedly mounted on the free end of contact bar 79 to extend laterally thereof and has an intermediate portion 87 of reduced diameter, the outer end of bar 75 being of Y-shape so that portion 87 may be positioned in the recessed or Y-shaped end of contact bar 75. Member 85 also has an end portion 89 which may be of somewhat reduced diameter and which is adapted to be engaged by the movable end of bimetal bar 69. Contact bar 79 has insulatedly mounted thereon a latch member 91 which may be of L-shape as shown more particularly in Fig. 7 of the drawings, a block 93 of electric insulating material being interposed between the contact bar 79 and member 91 and a screw 95 may extend through member 91, block 93 and into member 85 to hold all of these parts on contact bar 79.

A movable arm 97 is adapted to slide longitudinally of its length on plate 65 and for this purpose is provided with a slot 99 at that end thereof positioned against plate 65, a pair of short headed pins 101 holding the arm in its proper operative positions against the plate 65, preventing lateral deflection of the arm and permitting longitudinal movement thereof. The arm 97 is biased in one direction longitudinally of its length by a spring 103 one end of which is connected to a pin on plate 65 and the other end of which is connected to a pin on arm 97.

Arm 97 is provided with a lateral integral projection 105 on which is pivotally mounted, as on a pivot pin 107, a detent arm 109, the pivot pin 107 fitting into the arm 109 closer to one end thereof than to the other end. A lug 111 of substantially V-shape extends laterally over one edge of arm 109 for a purpose to be hereinafter set forth. Detent arm 109 is biased in a clockwise direction, as seen in Fig. 6 of the drawings, by a small spring 113, one end of which is connected to the short arm of detent 109 and the other end of which is connected to a pin on arm 97.

A bell crank lever arm 115 is pivotally mounted on plate 65 by a pivot pin 117 and has a straight arm 119 and an arm 121 of arcuate shape. The outer end of arm 119 is adapted to engage that side edge of detent 109 on which the V-shaped projection 111 is located. It is evident that spring 113 tending to turn detent 109 in a clockwise direction will tend to turn bell crank 115 in a counter-clockwise direction and this turning movement of member 115 is prevented by the fact that the outer end of arm 121 is moved into engagement, under certain operating conditions, with one face of bimetal bar 69 near the movable end thereof as shown, for instance, in Fig. 6 of the drawings. It may be further pointed out here than an adjusting screw 123 in rigid bar 71 near its outer end is adapted to engage a stop lug 125 which may be in the shape of a small bar integral with or secured to and extending laterally from the plate 65.

The design, construction and adjustment of the bimetal bar 69 and its associated rigid bar 71 is such that when the auxiliary electric heater 73 is energized, as will be hereinafter described in detail, the bimetal bar tends to warp and assuming normally a fixed position of the fixed end of the bimetal bar, the free end thereof would warp in a clockwise direction. The pivotal mounting for the bimetal bar and the rigid bar may comprise a pivot pin 127 and when the bimetal bar is heated and caused to warp to say the position shown in Fig. 12 of the drawings, it is evident that rigid bar 71 will be forced in a counter-clockwise direction on pivot pin 127 which turning movement will continue until the outer end of bar 71 engages a point on an angularly-extending cam surface 129 of a cam member 131 mounted on a shaft 133 suitably supported as by a bracket extension 135 of plate 65. We may here refer to the fact that this cam member 131 may be subjected to turning movement as by an adjusting knob 137 which may be supported by the translucent window 55. Any mechanical means for causing turning movement of knob 137 to effect turning movement of shaft 133 and cam member 131 thereon may be used by us.

Stop means for the arms 75 may comprise an adjustable stop screw 139 adjustably mounted in a block 141 of electric-insulating material which may be mounted on plate 65 in any desired manner. A second stop screw 143 is adapted to cooperate with the intermediate contact arm 77 under certain operating conditions of the bimetal bar 69 and of the multiple arm switch structure hereinbefore described. Stop screw 139 extends through openings in bars 77 and 79 and stop screw 143 extends through an opening in bar 79.

Referring now to Fig. 14 of the drawings, we have there shown an actuating means for arm 97 comprising an arm 145 which is pivotally supported on hinge pin 35 as by brackets 147. This arm 145 comprises a longer portion having a laterally bent end portion 149 adapted under certain operating conditions to engage a laterally bent end portion of arm 97, and a shorter arm 151 of arcuate shape. The outer end of the shorter arm 151 is adapted to be engaged by an intermediate bar 153 mounted in the upper hinge cover 33 or in any other suitable manner so that turning movement of the upper casing toward or into its open position, as shown in Fig. 14 of the drawings, will cause clockwise turning movement of arm 145 to thereby move arm 97 to substantially the position shown in Fig. 14 of the drawings during the time that the upper casing and grid are in their raised positions and the upper grid is disengaged from the lower grid.

The electric circuit through the auxiliary electric heating element 73 is extended through a thermally controlled switch comprising a resilient contact arm 155 having one end fixedly supported from plate 65 as by a small stud 157 electrically insulated from plate 65 and having a nut 159 engaging its screw threaded end. A thermo-flexible bar 161 has one end thereof mounted on the movable end of resilient arm 155 and the other end of this bi-metal bar 161 is adapted to engage with an adjusting screw 163, all for a purpose to be hereinafter described in detail. The contact arm 155 has mounted thereon a contact member adapted to engage with a fixed contact member 165 which is insulatedly mounted on plate 65 and held in proper operative position as by a short machine screw 167. A short conducting wire 169 connects contact member 165 with one end of the auxiliary heater 73 while the other end of this auxiliary electric heater is connected through a short conductor 170 to contact arm 79.

We may further here call attention to a compensating thermo-flexible element in the shape of a bimetal bar 171 one end of which is supported from the plate 65 on a bracket extension 173, the bimetal bar 171 being so located relatively to plate 65 that it is affected by the grid temperature of the waffle baker. The free or movable end of bi-metal bar 171 has secured thereto a pin 175 which extends through a slot 177 in plate 65 and is positioned between bar 71 and bimetal bar 69. Its purpose will be hereinafter set forth in detail.

The operation of our improved thermal timing means will now be described in detail starting with a cold waffle baker which has just been energized as by the connection of a contact plug (not shown) connected to a twin conductor cord 179 as shown in Fig. 3 of the drawings. The position of the parts of the thermal timer will then be substantially that shown in Fig. 6 of the drawings in which arm 97 is in its normal or initial position, which is shown more particularly in Fig. 4 of the drawings, from which it will be noted that arm 145 is out of engagement with arm 97 so that spring 103 will be effective to move the arm 97 to the limit of its right-hand travel as determined by the left-hand pin 101 in the slot 99. Detent 109 will be in substantially the position shown in Fig. 6 of the drawings during all the time that the waffle baker is cold and not energized and, of course, this position will continue for a short time after the heaters have been connected to an electric supply circuit. The bias applied to detent lever 109 is transmitted through the bell crank lever 115 to the bimetal bar 69 with the result that the adjusting screw 123 near the outer end of rigid arm 71 will be in engagement with the stop plug 125.

Let it be assumed that the above described connection to a suitable supply circuit has been made; it will be noted from the diagram of connections of Fig. 5 of the drawings that the main heaters will be energized and that the signal 59 will also be energized. The energizing circuit for the signal lamp 59 will be traced from one lead of the twin conductor cord 179 through a conductor 181 to and through lamp 59, through a conductor 183 to the fixed end of contact bar 75, through the cooperating contact members on bars 75 and 77 to a conductor 185 connected to the intermediate contact bar 77 and to the other lead of the twin conductor cord and to the supply circuit, all as shown in Fig. 5 of the drawings. It is therefore evident that the signal lamp 59 will light up and the translucent window 55 will be illuminated thereby indicating to the user or operator that the appliance is energized and is being preheated. It is evident also, from Fig. 5 of the drawings, that the energizing circuit through the auxiliary heater 73 on the bimetal bar 69 is not energized, since bimetal bar 161 has not yet been subjected to sufficient heat from the grids or from the lower heating element to cause it to flex sufficiently to effect engagement between contact bar 155 and fixed contact member 165. There will therefore be a time lag or a delay in the energization of the main bimetal bar of the thermal timer and the reason for this is substantially as follows.

We have hereinbefore stated that we prefer to embody relatively high wattage heating elements than heretofore used in order to obtain quick baking of the waffle batter and it has been found in actual practice that the preheating time required to bring the temperature of the grids to the proper operating value is greater or longer than the duration of the waffle baking operation. The design, construction and adjustment of the delay or lag thermostat 161 is therefore such that when it operates to close the circuit through the heater 73 and the bimetal bar 69 warps sufficiently to cause the parts controlled thereby to move to such a position that intermediate contact bar 77 will be disengaged from contact bar 75 to thereby deenergize and extinguish the signal lamp; this will not happen until after the grids have been heated to their proper temperature. The delay of the deenergization of the signal lamp after the grids have reached the proper or desired operating temperature need be only on the order of say ten or fifteen seconds but it is, of course, necessary that such delay be present in order to ensure that the user will not pour batter onto a grid whose temperature is not sufficient to properly receive the same and bake it without sticking. We may point out here that bimetal bar 161 may not always be necessary and that the thermal grid control means 51 may be used to cause the desired delay, as above described.

Referring next to Fig. 11 of the drawings, it will be noted that bimetal bar 69 has been heated by reason of current flowing through the auxiliary heater 73 so that it has flexed, as shown in this figure of the drawings, to such an extent that it has just come into engagement with the outer end of member 89. The bias of spring 113 on detent arm 109 has caused turning movement of bell crank lever 115 in a counter-clockwise direction until arm 119 has come into engagement with a stop pin 187 fitted into plate 65. It will be noted that adjusting screw 123 on rigid arm 71 is still in engagement with stop lug 125.

Further heating of the bimetal bar 69 will result in turning movement of rigid bar 71 in a counter-clockwise direction until, as shown in Fig. 12 of the drawings, the outer end of bar 71 engages a point on cam surface 129. Any further heating of bimetal bar 69 will result in movement of the free end thereof in a clockwise direction whereby the bimetal bar will cause movement of member 85 in a right-hand direction as seen in Fig. 12 of the drawings, to such a degree that contact bar 79 and contact bar 77 are flexed slightly in a clockwise direction with the result that contact bar 75 engages its cooperating stop screw 139 whereby a circuit through signal lamp 59 energized up to this time is interrupted, as hereinbefore set forth.

Heating of the bimetal bar 69 will continue for a short period of time until, as shown in Fig. 9 of the drawings, bimetal bar 69 has warped enough in a clockwise direction to cause disengaging movement of the outer contact arm 79 from the intermediate contact arm 77 with the result that not only is the signal lamp deenergized, but the auxiliary heating element 73 is also deenergized. Let it be assumed for the moment that the user is not ready or desirous of initiating a waffle baking operation as by turning the upper casing into the position shown in Fig. 3 of the drawings and pouring batter on the lower grid but leaves it in the position shown, for instance, in Figs. 2 and 4 of the drawings, that is, the waffle baker is permitted to idle. Immediately upon deenergization of the auxiliary heating element 73 the bimetal bar 69 will start to cool and will therefore tend to flex in a counter-clockwise direction with the result that contact bar 79 will again move into engagement with the intermediate contact arm 77 to thereby reenergize the auxiliary heater 73, but this flexing movement of the bimetal timer bar is not sufficient to cause energization of the signal lamp. The bimetal bar will then again be heated, flex in a clockwise direction with resultant disengagement of contact arms 77 and 79 to again deenergize the auxiliary heater 73, which sequential energization and deenergization of the heating element and flexing movements in one and then in the reverse direction will continue as long as the waffle baker is maintained in idling operation. It is thus evident that in our device the thermal timer and particularly the bimetal element 69 is maintained at substantially the maximum operating temperature, that is, it is maintained in an energized condition ready to operate on a cool-off heat-up cycle to control the signal lamp to indicate the adjusted and desired duration of a waffle baking operation. During this idling period the lamp 59 is maintained in deenergized condition thus indicating to the operator that the waffle baker is ready for use.

Let it be assumed now that the user desires to start a waffle baking operation, he having been notified of the proper operative condition of the baking grids by reason of the fact that the lamp 59 was extinguished. He will then raise the upper casing and grid and cause movement of bar 97 in a left-hand direction, as seen in Fig. 6 of the drawings, which will result in movement of these parts to the positions shown in Fig. 15 of the drawings. As was hereinbefore stated, the position of the parts in Fig. 15 corresponds to that shown for the same parts in Fig. 14. It will be noted that lug 111 has been moved to the left-hand side of latch member 91. It will further be noted that contact arms 75 and 77 and 79 are all out of engagement with each other which means that not only is the signal lamp 59 momentarily deenergized but also the auxiliary heater 73. It may be pointed out, that as long as the upper grid and casing are in the positions shown in Figs. 14 and 15, the bimetal timer element will be effective to cause successive energization and deenergization of the auxiliary heater 73 to maintain the timer in ready-to-operate condition. Let it be assumed now that batter has been poured on the lower grid and that the upper grid and casing have been moved to their proper operative position as shown in Fig. 4 of the drawings. It will be evident that spring 103 has caused slight movement of arm 97 in a right-hand direction and to substantially the position shown in Fig. 16 of the drawings where the lug 111 will have been moved into engagement with detent member 91 biasing the same in a right-hand direction. This has the result that the circuit through auxiliary heater 73 has been de-energized by disengagement of contact arm 77 and 79 as shown in Fig. 16 of the drawings.

When the operator has again lowered the upper grid, arm 97 and lever arm 109 are moved into the positions shown in Fig. 16 whereby contact bar 79 is moved in a clockwise direction and out of contacting engagement with contact arm 77 to effect deenergization of the auxiliary heater 73 and to cause the timer bimetal element 69 to start on its cooling cycle. Contact bar 75 is caused to move in a clockwise direction by reason of its engagement with member 85, which latter member moves with elements 79, 91, 93 and 95 because of the engagement of projection 111 with element 91, all as hereinbefore described. The energizing circuit through the signal lamp 59 is thus closed and the illuminated window 55 indicates to the operator that a baking cycle is in operation.

Cooling of the bimetal bar 69 and flexing thereof or reduction of its warpage will continue until the moving end of bimetal bar 69 again engages the end of arm 121 of bell crank lever 115 which engagement, upon continued cooling of the bimetal bar, will cause turning movement of the bell crank lever in a clockwise direction on its pivot pin with resultant turning movement of detent arm 109 in a counter-clockwise direction until lug 111 is disengaged from member 91, whereby contact arm 79 will be free, because of its own bias, to move in a counter-clockwise direction to again engage the intermediate contact arm 77. When bar 79 moves in a counter-clockwise direction, member 85 will also move and the bias imparted by it on contact bar 75 in a clockwise direction will momentarily be interrupted with attendant momentary interruption of the signal lamp circuit, but contact arms 75 and 77 will be caused to engage again because of the biasing action of contact arm 79 in the counter-clockwise direction. Heater 73 on bimetal bar 69 is therefore again energized with resultant flexing or warpage of bimetal bar 69 in a clockwise direction, its engagement with end 89 of member 85 with resultant movement of arm 79 and of intermediate arm 77 in a clockwise direction until they have again been moved to the position shown in Fig. 9 of the drawings where the energizing circuit through the signal lamp has been interrupted to indicate the completion of the timing cycle of the timing means. This will indicate to the user that the waffle has been baked for the desired and adjusted length of time as called for by the adjustment of knob 137 at the temperature of the baking grids called for by the adjusting knob 57.

It is, of course, to be pointed out further that when a relatively large or high capacity heating element is used on each of the waffle grids, the thermally-actuated means for controlling the grid temperature will be effective to interrupt the energizing circuit of the main grid heaters and to reestablish it one or more times during such a baking operation. It is to be noted therefore that there is not constraint of independent action of the main grid-controlling thermostatic means and the main thermal timing element, bimetal bar 69, and that it is therefore possible to use relatively large capacity heating elements which are properly controlled by a thermostat to maintain the temperature of the grids within relatively narrow limits. It is further obvious that when cold batter is poured on the lower grid, the temperature of both grids when they are placed in cooperative baking positions will be momentarily reduced to a greater extent than will occur during idling or during the latter part of a baking operation.

It is obvious also that, during the time that the waffle baker is idling ready for operation, the lengths of time during which the grid heaters are energized will be shorter than when the waffle baker is being used in baking of waffles, since it is necessary that the amount of heat generated in the main waffle baking heaters be greater, when baking, in order to effect baking of the initially cold batter poured on the lower grid. This has the result that the amount of heat available in the device will be greater over a given length of time when baking than when idling and it is, of course, obvious that a greater amount of heat, over a given period of time, will be radiated or otherwise conducted downwardly from the lower heater and grid and that this increased amount of heat will have some effect upon parts of the thermal timer. Although it may be here pointed out that this increased amount of heat lost or flowing downwardly becomes effective relatively slowly only, we have found that its final or maximum effect is obvious after a period of time of continuous use for quickly successive baking operations, say on the order of twenty to thirty minutes. The thermal timing means will be subject to this downwardly flowing heat and the bimetal bar 69 will therefore cool more slowly and cause an undesirable increase in the duration of the baking operation.

In order to counteract this increase in temperature, we provide the bimetal bar 171 which is so positioned that it is subjected to heat from particularly the lower grid as well as to a small extent from the lower heater 37. Reference to Figs. 15 and 16 of the drawings will show the position occupied by this compensating bimetal bar 171 and the pin 175 mounted thereon at its movable end when the waffle baker has been operated for a relatively long period in quickly successive baking operations so that the temperature of the compensating bimetal bar 171 has been increased to substantially its maximum operating temperature.

The effect of the movement of pin 175 in a clockwise direction is that it tends to hold the relatively rigid bar 71 at or near its maximum left-hand position to which it has been moved by the heating up and the flexing of the main bimetal timer bar 69 and this has the result that, on cooling of the bimetal bar 69, it will move more quickly in a counter-clockwise direction to engage the rounded end of arm 121 to cause its turning movement in a clockwise direction to effect release of lug or projection 111 from member 91. In other words, the cooling-off period of the timer mechanism is reduced whereby a decrease in the total duration of the operating period of the timer and therefore of the signal controlled thereby is effected. This, of course, has the result that the same degree of baking of the batter is effected when the waffle baker has been used for a relatively long period of quickly successive operating cycles as was obtained during the first or the next few succeeding baking operations.

As has already been hereinbefore set forth, the average grid temperature may be adjusted by turning movement of knob 137 while the duration of a timing operation gone through with by the timing mechanism can be adjusted independently thereof and without reference thereto by turning movement of knob 57 which, as was hereinbefore set forth, will cause turning movement of shaft 133 and therefore of the cam surface 135. When the cam surface 135 has been turned by the operator so that the particular point on its surface engageable by the outer movable end of rigid bar 71 is initially a relatively large distance away from the end of the bar, the timer bar 69 must be heated to a higher temperature to cause engagement of the end of the rigid bar 71 with the cam surface 135 than would be the case if the cam surface 135 had been so turned as to bring the point thereon to be engaged by bar 71 initially closer to the rigid bar, under which conditions it would require a lower temperature value in the bimetal bar to cause the movable end of the rigid bar to engage the cam surface 135 acting as a stop member for the rigid bar in its counter-clockwise turning movement.

It is therefore possible for a user of a waffle baker embodying our invention to adjust the grid temperature provided by the main grid heaters for say a low value and to so adjust the timer mechanism that it will provide a relatively short timing period in which case a waffle baked to a light brown color and baked relatively lightly only on the inside thereof would be obtained. Should the operator so adjust the thermal control for the main heaters as to obtain say the maximum grid temperature and so adjust the timing mechanism as to obtain a relatively long timing period therein, he would obtain not only a darker brown surface on the waffle but also a waffle which was well done throughout its mass. It is also evident that the user can adjust the grid temperature for a low value and the timer for a long value to cause relatively low temperature baking of the batter over a long time. Further, the operator can adjust the grid temperature for say a high or for its maximum value and adjust the timing means for a short time period so as to obtain a high degree of surface searing or baking and a short time period of baking, which would result in a relatively moist interior of the waffle.

We wish to point out also that the cycle of operation of the timing means is quite different from that now disclosed and claimed in patents covering the use of a somewhat similar timing means which, in the case of bread toasters, are maintained in inoperative condition or in a substantially cold condition or at relatively low temperature conditions during the time that the toaster is not in use, and in which timing devices the bimetal timer bar operates on the heat-up cool-off principle. In contra-distinction to this our timing means operates on substantially the opposite cycle, that is, the main timing element, a bimetal bar in the device illustrated in the instant application, is raised to its maximum operating temperature substantially simultaneously with the raising of the temperature of the grids to their operating temperature, but with a time lag, as already explained, and is maintained at substantially this maximum temperature during the idling periods of a waffle baker and will then, and co-incidentally with the initiation of a baking operation, be mechanically constrained by opening and then closing of the upper grid to start on the cooling part of its cycle and, when it has been cooled to a predetermined lower temperature, it then starts itself on the heat-up part of its cycle. It is, of course, evident that the maximum and the mean temperatures to which the thermal timing bar 69 will be heated and cooled are adjustable and are determined by the design, construction and adjustment of the various parts of the timing mechanism.

We wish to here point out that our improved timer is therefore maintained in its energized condition during the idling of a cooking appliance, such as a waffle baker, which must be maintained at a high, ready-to-operate temperature, which is in direct and complete contra-distinction to the operation of the so-called heat-up cool-off timers which have been suggested for use on automatic intermittently operable toasters.

While we have illustrated and described a specific embodiment of a thermal timer embodying our invention, it is obvious that changes and modifications may be made therein without departing from the scope of our invention and we desire that all such modifications clearly coming within the scope of the appended claims shall be considered to be covered thereby.

We claim as our invention:

1. A thermal timing means for use with a heat treating apparatus comprising main electric heating means and adapted to be heated to and maintained at a predetermined operating temperature, said timing means including a thermally actuable element out of close heat receiving relation with said apparatus, means to heat said thermally actuable element to a predetermined operating temperature and means controlled by heat from said apparatus to delay initial energization of said element heating means to ensure that the thermally actuable element will reach its operating temperature after the apparatus reaches its operating temperature.

2. A thermal timing means for indicating the duration of a heat treatment of a heat treating apparatus having an operating and a non-operating position and comprising a source of heat adapted to maintain the apparatus at operating temperature, said thermal timing means including a thermal element, means controlled by said thermal element to maintain the temperature thereof at a given high value during non-operating periods of the apparatus, means controlled sequentially by said apparatus when moved into operating position and by said thermal element to cause cooling and then reheating of said thermal element and means controlled by said thermal element when it has been reheated to said given high value to indicate termination of an operation.

3. A thermal timing means for indicating the duration of a baking operation of a waffle baker comprising a heated lower grid and a heated upper grid movable away from and into engagement with said lower grid and thermally actuable means for maintaining the grid temperature at an adjustable substantially uniform value, said timing means comprising a thermal element out of close heat receiving relation with said grids, means controlled thereby for maintaining said thermal element at a predetermined high temperature when the waffle baker is idling while heated and means controlled by the upper grid and effective when the upper grid is moved into engagement with the lower grid to cause cooling of the thermal element of the timing means to initiate a timing cycle of the timing means.

4. A thermal timing means for indicating the duration of a baking operation of a waffle baker comprising a pair of relatively movable heated grids and thermally actuable means for maintaining the temperature of said grids at an adjustable substantially uniform value both during idling and during operating periods, said thermal timing means including a thermal element out of direct heat receiving relation with said grids, means controlled by the thermal element for maintaining it at a predetermined high temperature during idling periods and means actuable by one of said grids for causing cooling of said thermal element for initiating a timing cycle of the timing means simultaneously with the initiation of a baking operation.

5. A thermal timing means for indicating the duration of a baking operation of a waffle baker comprising a pair of relatively movable heated grids and thermally actuable means for maintaining the temperature of said grids at an adjustable substantially uniform value both during idling and during operating periods, said thermal timing means including a thermal element out of direct heat receiving relation with said grids, an auxiliary electric heater for said thermal element, means controlled by said thermal element for causing said auxiliary heater to maintain the thermal element at an adjustable predetermined high temperature during idling periods of the waffle baker, means actuable by one of said grids for terminating energization of said auxiliary heater simultaneously with the initiation of a baking operation to cause cooling of the thermal element, means actuable by the thermal element when it has cooled to a predetermined low temperature to cause reenergizatoin of said auxiliary heater and reheating of the thermal element and means controlled by the thermal element to indicate termination of a baking operation when the thermal element has again reached said predetermined high temperature.

6. A thermal timing means for indicating the duration of a baking operation of an electrically heated waffle baker, said thermal timing means including a thermally actuable element out of close heat receiving relation with said waffle baker, means controlled by the thermal element for maintaining the thermal timing means in heated condition to start a timing cycle comprising a cooling period and means for causing initiation of the cooling period of a timing cycle of said timing means simultaneously with the initiation of a waffle baking operation.

7. A thermal timing means for indicating the duration of a baking operation of a waffle baker heated during idling periods and comprising a pair of grids movable into open and closed positions relatively to each other, electric heating means for said grids and thermally actuable means for controlling the energization of said heating means to maintain substantially uniform average adjustable temperatures in said grids during idling and operating periods, said timing means including a thermally-responsive element positioned out of close heat receiving relation with said grids, means controlled by the thermally-responsive element for maintaining the thermal timing means in heated condition to start a timing cycle comprising a cooling period during idling periods and means effective when the grids have been moved into closed position relatively to each other and actuable by one of said grids for initiating the cooling period of a timing cycle of the thermal timing means.

8. A thermal timing means for indicating the duration of a baking operation of a waffle baker heated during idling periods and comprising a pair of grids movable into open and closed positions relatively to each other, electric heating means for said grids and thermally actuable means for controlling the energization of said heating means to maintain substantially uniform average adjustable temperatures in said grids during idling and operating periods, said timing means including a thermally-responsive element positioned out of close heat receiving relation with said grids, an auxiliary electric heater for causing heating of the thermally-responsive element, means controlled by the thermally-responsive element for causing sequential energization and deenergization of said auxiliary electric heater to maintain the thermally-responsive element at an adjustable predetermined average temperature during idling periods of the waffle baker and means for initiating a timing cycle of the thermal timing means actuable by one of said grids when moved to closed position to initiate a baking operation.

9. A thermal timer for controlling a signal indicating the time of starting and of stopping of an operation of a heat treating apparatus comprising main electric heating elements adapted to be initially heated to and then maintained at a predetermined operating temperature and a signal means, said timing means comprising a thermo-sensitive element out of close heat receiving relation with said apparatus, an auxiliary electric heater effective to heat said thermo-sensitive element to a predetermined operating temperature and cause the latter to effect a change in the condition of said signal and means controlled by heat from said apparatus to delay initial energization of said auxiliary electric heater after the energization of said main heating elements to ensure that the thermo-sensitive element will reach its operating temperature after the apparatus reaches its operating temperature.

10. A thermal timer for controlling a signal indicating the time of starting of a baking operation of a waffle baker comprising heated grids requiring a preheating period of a predetermined duration to heat the grids to baking temperature and having an operating period of less than the preheating period, and main electric heaters for each of said grids, said timer including a signal, a thermally-actuable element out of close heat receiving relation with said heated grids, an auxiliary electric heater for said thermally-actuable element effective when energized to heat said thermally-actuable element to a predetermined operating temperature and cause the latter to deenergize the auxiliary electric heater to start cooling the thermally-actuable element and simultaneously to cause a change in the indication of the signal and a second thermally-actuable element subject to heat from said heated grids to delay energization of said auxiliary electric heater for such a length of time after initial energization of said main electric heaters that the first named thermally-actuable element will reach its maximum operating temperature after the grids have reached the desired baking temperature.

11. A thermal timer for controlling a signal for indicating the times of initiation and termination of baking operations of a waffle baker comprising a pair of grids, main electric heating means for said grids and a first thermal element for controlling the energization of said main heating means and adapted to cause a given amount of heat to be applied to the grids when idling and to cause a greater amount of heat to be applied to the grids during a plurality of successive baking operations, said thermal timer including a signal, a second thermal element whose ambient temperature conditions are modified by heat from the grids, for controlling said signal, an auxiliary electric heater for said second thermal element effective to cause heating of said second thermal element to a predetermined high temperature and cause the latter to deenergize the auxiliary electric heater to start cooling the second thermal element and then to cause reenergization of the auxiliary heater and reheating of the second thermal element to control the signal to indicate proper times of initiation and of termination of a baking operation, and a third thermal element subject to heat from the grids for causing the thermal element of said timer to control the signal with substantially uniform lengths of time between the initiation and termination indications of the signal irrespective of the increase in the amount of heat applied to the grids during a plurality of successive baking operations.

JOHN R. GOMERSALL.
MURRAY IRELAND.